United States Patent Office 3,775,421
Patented Nov. 27, 1973

3,775,421
5a,6,7,8,9,9a-HEXAHYDRO-9a-HYDROXYPYRIDO
[2,1-b]BENZOTHIAZOLIUM HALIDES
Peter H. L. Wei, Springfield, Pa., assignor to American
Home Products Corporation, New York, N.Y.
No Drawing. Original application Mar. 17, 1971, Ser. No.
125,410, now Patent No. 3,694,449, dated Sept. 26,
1972. Divided and this application May 15, 1972, Ser.
No. 253,384
Int. Cl. C07d 31/50
U.S. Cl. 260—294.8 B        2 Claims

ABSTRACT OF THE DISCLOSURE

Novel pharmacologically active compounds have been prepared of the formulae

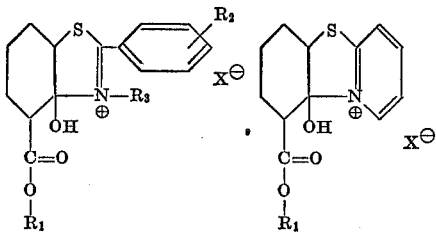

and

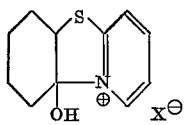

wherein $R_1$ and $R_3$ are selected from the group consisting of hydrogen and (lower)alkyl; $R_2$ is selected from the group consisting of hydrogen, (lower)alkyl, nitro, halogen, (lower)alkoxy, hydroxy and

wherein $R_4$ and $R_5$ when not concatenated are independently selected from the group consisting of hydrogen and (lower)alkyl and when concatenated form a radical selected from the group consisting of piperazinyl, piperidinyl, pyrrolidinyl and morpholinyl; X is halogen.

CROSS REFERENCE TO RELATED APPLICATIONS

This application is a division of copending application Ser. No. 125,410, filed Mar. 17, 1971, now U.S. Pat. 3,694,449.

DESCRIPTION OF THE INVENTION

This invention is concerned with the preparation of novel chemical compounds which are pharmacologically active as central nervous system depressants. They are useful as calming agents for mammals.

The compounds are of the formulae:

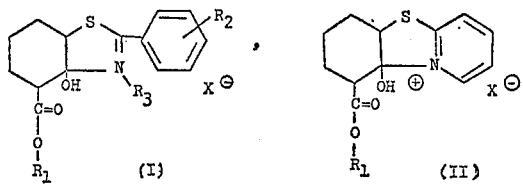

and

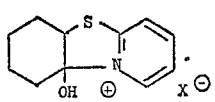

wherein $R_1$ and $R_3$ are hydrogen and (lower)alkyl; $R_2$ is selected from the group consisting of hydrogen, (lower)-alkyl, nitro, halogen, (lower)alkoxy, hydroxy and

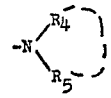

wherein $R_4$ and $R_5$ when not concatenated are independently selected from the group consisting of hydrogen and (lower)alkyl and when concatenated form a radical selected from the group consisting of piperazinyl, piperidinyl, pyrrolidinyl and morpholinyl; X is halogen.

The compounds of Formula I may be prepared according to the following reaction scheme:

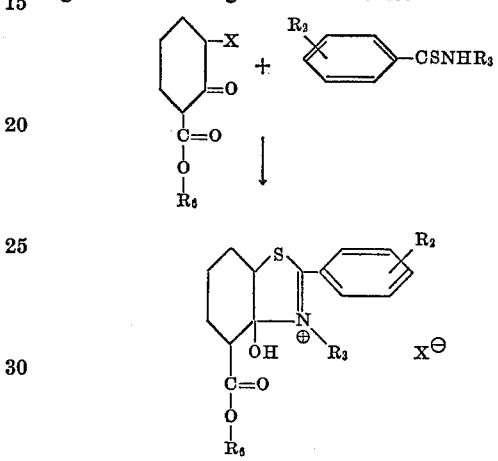

wherein $R_2$, $R_3$ and X are the same as hereinabove defined and $R_6$ is lower alkyl.

The compounds are prepared by heating the reaction in an alcohol solution at a temperature of 80° to 100° for a period of 3 to 8 hours. The solvent is removed and the residue is triturated with ether and dimethoxyethane and the crude solid material which is collected can be recrystallized from ethanol.

Compounds of Formula II may be prepared by the following procedure:

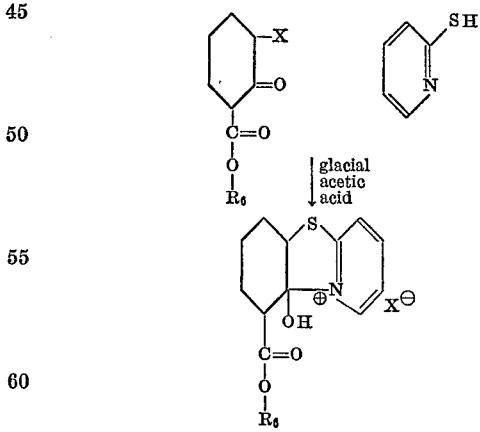

wherein X is the same as hereinabove defined and $R_6$ is lower alkyl. The reactants are allowed to react in glacial acetic acid at a temperature of from 80° to 100° for a period of 2 to 5 hours. Upon cooling, the solid is collected and washed with dimethoxyethane and ether. The crude material can be recrystallized from ethanol.

Compounds of Formula I and Formula II wherein $R_1$ is hydrogen may be prepared by the hydrolysis of the corresponding ester. The preferred method of hydrolysis is to use a 40–50% mixture hydrohalic acid such as hydrobromic acid at a temperature of from 50° to 80° for a period of 20 to 40 minutes. After the solvent is removed at reduced pressure, the residue may be triturated with a solvent, such as acetone and collected.

As used herein the term (lower)alkyl is used to include hydrocarbon radicals such as methyl, ethyl, n-propyl, i-propyl and n-butyl. The term halogen is used to include chlorine, bromine and iodine.

In the evaluation of the biological activity of the compounds of this invention, the in vivo effects were tested as follows: The compound was administered orally or intraperitoneally to three mice (14 to 24 grams) at each of the following doses: 400, 127, 40 and 12.7 milligrams per kilogram of host body weight (m.p.k.). The animals were watched for a minimum of two hours during which time signs of general stimulation (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) were noted.

The compounds of this invention induce central nervous system depressant effects at a dose of 127 to 400 m.p.k. Thus the compounds of the invention, have demonstrated utility as pharmacologically active compounds in experimental and comparative pharmacology and are of value in the treatment of mammals, e.g., mice, rats, etc., who are responsive to treatment with central nervous system depressant agents. Specifically the compounds may be administered for the purpose of inducing a calming effect in mammals.

When the compounds of the invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk sugar, calcium carbonate and the like. They may be administered orally in the form of soutions which may contain coloring and flavoring agents or they may be administered by parenteral injection, e.g., intramuscular injection. The injectable solution may contain other solutes such as sodium chloride or glucose in a sufficient quantity to render the solution isotonic.

The dosage of the pharmacological agents of the invention may vary with the route of administration and the particular compound chosen.

The following examples are not to be construed as limitations of the invention:

EXAMPLE 1

4-carboxy-2-(p-dimethylaminophenyl)-3a,4,5,6,7,7a-hexahydro - 3a - hydroxy-3-methylbenzothiazolium bromide ethyl ester p-Dimethylamino-N-methylthiobenzamide was prepared following the procedure of Gaomaise and Chambers [J. Med. Chem., 11, 1205–8 (1968)].

An alcoholic solution of 6-bromo-2-carbethoxyclohexanone (4.9 g., 0.02 m) and p-dimethylamino-N-methylthiobenzamide (3.6 g., 0.02 m) was heated to reflux for 5 hours. After removal of ethanol the residue was treated with ether. The residue upon standing solidified. The crude material after treatment with dimethoxy ethane weighed 5.0 g. and melted at 175–8° C. Recrystallization from ethanol gave pure ethyl ester of 4-carboxy-2-(p-dimethylaminophenyl)-3a,4,5,6,7,7a-hexahydro-3a-hydroxy-3-methyl-benzothiazolium bromide, M.P. 181–3° C.

*Analysis.*—Calcd. for $C_{19}H_{21}BrN_2O_3S$ (percent): C, 51.46; H, 6.14; N, 6.32. Found (percent): C, 51.26; H, 6.09; N, 6.30.

IR (KBr): $3.4\mu$ (OH); 5.8 (ester CO); 6.25 (C=N). NMR (CDCl$_3$): $\delta$ 7.3 (m., 4); 4.3 (q., 2, OCH$_2$), 1.3 (t., 3, CH$_3$); NCH$_3$, 3.2 (s., 3); 3.7 (m.).

EXAMPLE 2

9-carboxy-5a,6,7,8,9,9a-hexahydro-9a-hydroxypyrido [2,1-b]benzothiazolium bromide, ethyl ester An acetic acid (60 ml.) solution of 6-bromo-2-carbethoxycyclohexanone (12.45 g. or 0.05 m) and 2-mercaptopyridine (5.55 g. or 0.05 m) was heated on a steam bath for 3½ hours. Upon cooling the solid that separated was collected and washed with dimethoxyethane and ether. The crude material was recrystallized from ethanol. The pure ethyl ester of 9-carboxy-5a,6,7,8,9,9a-hexahydro-9a-hydroxypyrido[2,1-b]benzothiazolium bromide weighed 14.9 g. (82% yield), M.P. 206–207°.

*Analysis.*—Calcd. for $C_{14}H_{18}NO_3S \cdot Br$ (percent): C, 46.67; H, 5.03; Br, 22.18; N, 3.89; S, 8.90. Found (percent): C, 46.48; H, 4.97; Br, 22.07; N, 4.03; S, 8.70.

IR spectrum (KBr) showed the presence of ester absorption at $5.8\mu$ and the absence of keto carbonyl at $6.0\mu$. NMR spectrum (DMSO-d$_6$), $\delta$ 1.1 (t., J=7 Hz.), 4.1 (q., J=7 Hz.). Other aliphatic protons as complex multiplets absorbed at 1.8 to 2.2 and 3.6, the hydroxy proton was found at $\delta$ 4.8 was exchanged in D$_2$O.

EXAMPLE 3

5a,6,7,8,9,9a-hexahydro-9a-hydroxypyrido- [2,1-b]benzothiazolium bromide

A 48% HBr (30 ml.) solution of ethyl ester 9-carboxy - 5a,6,7,8,9,9a - hexahydro-9a-hydroxypyrido[2,1-b] benzothiazolium bromide (6.0 g.) was heated on a steam bath. Gas evolution ceased at the end of the reaction period (3 hours). The solvent was removed in vacuo and the residue treated with benzene and the benzene was also removed. The residue was finally treated with acetone and the solid collected which weighed 4.4 g. Upon recrystallization from ethanol pure 5a,6,7,8,9,9a-hexahydro - 9a - hydroxypyrido[2,1-b]benzothiazolium bromide melted at 213–15° C.

*Analysis.*—Calcd. for $C_{11}H_{14}NOS \cdot Br$ (percent): C, 45.83; H, 4.90; Br, 27.73; N, 4.86; S, 11.13. Found (percent): C, 45.66; H, 5.09; Br, 27.40; N, 4.98; S, 11.16.

IR spectrum (KBr) showed the disappearance of carbonyl absorption. NMR (DMSO-d$_6$): $\delta$ 8.5 (m.); 4.6 (t.); complex multiplet 1.8 $\delta$.

By analogous methods the chloride and iodide salts may be obtained.

EXAMPLE 4

9-carboxy-5a,6,7,8,9,9a-hexahydro-9a-hydroxy- pyrido[2,1-b]benzothiazolium bromide A 48% HBr solution (40 ml.) of 9-carboxy-5a,6,7,8, 9,9a-hexahydro-9a-hydroxpyrido[2,1 - b]benzothiazolium bromide ethyl ester (5.0 g.) was heated gently in a hot water bath for 30 minutes. The solvent was removed at reduced pressure and the solid residue (3.0 g.) after treatment with acetone was collected, and dried in a drying pistol at reduced pressure to afford product, M.P. 170–5°.

*Analysis.*—Calcd. for $C_{21}H_{14}NO_3S \cdot Br$ (percent): C, 43.38; H, 4.25; Br, 24.05; N, 4.22; S, 9.65. Found (percent): C, 43.08; H, 4.46; Br, 23.77; N, 4.26; S, 9.83.

IR (KBr) $3.5\mu$ (OH); 5.85 (carboxyl CO). NMR (DMSO-d$_6$) $\delta$ 8.5 (m.); aliphatic, 1.9 (m.).

By methods analogous to those employed in Example 1, the following compounds are prepared:

TABLE I 4-carboxy-2-(p-nitrophenyl)-3a,4,5,6,7,7a-hexahydro-3a- hydroxy-3-ethylbenzothiazolium bromide, methyl ester 4-carboxy-2-(p-toluene)-3a,4,5,6,7,7a-hexahydro-3a- hydroxy-3-methylbenzothiazolium chloride, n-propyl ester 4-carboxy-2-(p-bromophenyl)-3a,4,5,6,7,7a-hexahydro- 3a-hydroxy-3-methylbenzothiazolium bromide, ethyl ester 4-carboxy-2-(p-ethoxyphenyl)-3a,4,5,6,7,7a-hexahydro-3a-hydroxy-3-n-propylbenzothiazolium bromide, ethyl ester 4-carboxy-2-(m-chlorophenyl)-3a,4,5,6,7,7a-hexahydro-3a-hydroxy-3-ethylbenzothiazolium bromide, methyl ester 4-carboxy-2-(p-ethylphenyl)-3a,4,5,6,7,7a-hexahydro-3a-hydroxy-3-n-propylbenzothiazolium bromide, i-propyl ester 4-carboxy-2-(p-hydroxyphenyl)-3a,4,5,6,7,7a-hexahydro-3a-hydroxy-3-methylbenzothiazolium chloride, ethyl ester 4-carboxy-2-(p-methoxyphenyl)-3a,4,5,6,7,7a-hexahydro-3a-hydroxy-3-ethylbenzothiazolium bromide, methyl ester 4-carboxy-2-[p(4-morpholinyl)phenyl]-3a,4,5,6,7,7a-hexa-hydro-3a-hydroxy-3-methylbenzothiazolium bromide, ethyl ester 4-carboxy-2-[p-(1-piperidinyl)phenyl]-3a,4,5,6,7,7a-hexahydro-3a-hydroxy-3-methylbenzothiazolium chloride, methyl ester 4-carboxy-2-(p-aminophenyl)-3a,4,5,6,7,7a-hexahydro-3a-hydroxy-3-ethylbenzothiazolium bromide, ethyl ester 4-carboxy-2-phenyl-3a,4,5,6,7,7a-hexahydro-3a-hydroxy-3-methylbenzothiazolium chloride, isopropyl ester 4-carboxy-2-[p-(N-methylamino)phenyl]-3a,4,5,6,7,7a-hexahydro-3a-hydroxy-3-ethylbenzothiazolium bromide, n-propyl ester 4-carboxy-2-[p-(1-piperazinyl)phenyl]-3a,4,5,6,7,7a-hexahydro-3a-hydroxy-3-ethylbenzothiazolium bromide, methyl ester 4-carboxy-2-[p-pyrrolidinyl)phenyl]-3a,4,5,6,7,7a-hexahydro-3a-hydroxy-3-methylbenzothiazolium fluoride, ethyl ester.

By methods analogous to those employed in Example 4 the following compounds may be obtained:

TABLE II 4-carboxy-2-(p-nitrophenyl)-3a,4,5,6,7,7a-hexahydro-3a-hydroxy-3-ethylbenzothiazolium bromide 4-carboxy-2-(p-toluene)-3a,4,5,6,7,7a-hexahydro-3a-hydroxy-3-methylbenzothiazolium chloride 4-carboxy-2-(p-bromophenyl)-3a,4,5,6,7,7a-hexyhydro-3a-hydroxy-3-methylbenzothiazolium bromide 4-carboxy-2-(p-ethoxyphenyl)-3a,4,5,6,7,7a-hexahydro-3a-hydroxy-3-n-propylbenzothiazolium bromide 4-carboxy-2-(m-chlorophenyl)-3a,4,5,6,7,7a-hexahydro-3a-hydroxy-3-ethylbenzothiazolium bromide 4-carboxy-2-(p-ethylphenyl)-3a,4,5,6,7,7a-hexahydro-3a-hydroxy-3-n-propylbenzothiazolium bromide 4-carboxy-2-(p-hydroxyphenyl)-3a,4,5,6,7,7a-hexahydro-3a-hydroxy-3-methylbenzothiazolium chloride 4-carboxy-2-(p-methoxyphenyl)-3a,4,5,6,7,7a-hexahydro-3a-hydroxy-3-ethylbenzothiazolium bromide 4-carboxy-2-[p-(4-morpholinyl)phenyl]-3a,4,5,6,7,7a-hexahydro-3a-hydroxy-3-methylbenzothiazolium bromide 4-carboxy-2-[p-(1-piperidinyl)phenyl]-3a,4,5,6,7,7a-hexahydro-3a-hydroxy-3-methylbenzothiazolium chloride 4-carboxy-2-(p-aminophenyl)-3a,4,5,6,7,7a-hexahydro-3a-hydroxy-3-ethylbenzothiazolium bromide 4-carboxy-2-phenyl-3a,4,5,6,7,7a-hexahydro-3a-hydroxy-3-methylbenzothiazolium chloride 4-carboxy-2-[p-(N-methylamino)phenyl]-3a,4,5,6,7,7a-hexahydro-3a-hydroxy-3-ethylbenzothiazolium bromide 4-carboxy-2-[p-(1-piperazinyl)phenyl]-3a,4,5,6,7,7a-hexahydro-3a-hydroxy-3-ethylbenzothiazolium chloride 4-carboxy-2-[p-(1-pyrrolidinyl)phenyl]-3a,4,5,6,7,7a-hexahydro-3a-hydroxy-3-methylbenzothiazolium bromide.

I claim:

1. A compound selected from the group consisting of

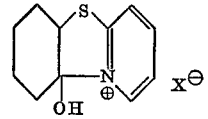

wherein X is the chloride, bromide or iodide anion.

2. A compound as defined in claim 1 which is 5a,6,7,8,9,9a-hexahydro-9a-hydroxypyrido[2,1-b]benzothiazolium bromide.

References Cited

UNITED STATES PATENTS 3,694,449  9/1972  Wei _____ 260—294.8 B

ALAN L. ROTMAN, Primary Examiner

U.S. Cl. X.R.

260— 247.2 R, 247.2 B, 268 BC, 293.57, 306.7, 306.8 R; 424—250, 266, 267, 270